Patented Aug. 19, 1924.

1,505,302

UNITED STATES PATENT OFFICE.

ROBERT FREDERICK WILKINS AND HARRY CHANDLER, OF BRISTOL, ENGLAND.

COMPOSITION FOR FACING WALLS AND PARTITIONS.

No Drawing.    Application filed February 15, 1924.   Serial No. 693,114.

*To all whom it may concern:*

Be it known that we, ROBERT FREDERICK WILKINS, of Stapleton, Bristol, Gloucestershire, England, and HARRY CHANDLER, of Knowle, Bristol, Gloucestershire, England, both subjects of the King of Great Britain and Ireland, have invented certain new and useful Improvements in Compositions for Facing Walls and Partitions, of which the following is a specification.

This invention consists in a composition for facing walls and partitions of buildings, either externally or internally, or both, which said composition imparts thereto the semblance of freestone construction.

The composition in which this invention consists comprises freestone dust or other suitable fine clean sand, white cement, silver sand, a compound containing hydrated lime, fat, and alkali metal carbonates, solutions of sulphate of iron and alum, hydrochloric acid and water.

The facing composition comprises the following solid constituents in, approximately, the following proportions, namely:—

| | Per cent. |
|---|---|
| Freestone dust or other suitable fine clean sand | 50 |
| White cement | 25 |
| Silver sand | 20 |
| A compound containing hydrated lime, fat, and alkali metal carbonates | 5 |

The aforesaid solids combined are mixed with a liquid of which the constituents are, approximately, ¼ pint of hydrochloric acid, ¼ ounce of sulphate of iron dissolved, and 1 ounce of alum dissolved, the iron sulphate and alum being dissolved together in as much boiling water as suffices for effective solution.

In the mixture of the liquid with the solids the proportion is about 2 gallons of the liquid to 8 gallons of combined solids. The admixture is made on a clean platform and, when completed, the compound is of a pasty consistency adapting it to be laid on with a trowel or the like. After laying on, the composition is rubbed over with a hand board, technically termed a float, to a "true" face.

Imitation of jointing may be imparted to the "laid-on" facing by indenting or "raking" and filling in the grooves thus produced with a suitable filling such, for example, as a mixture of the abovementioned compound of hydrated lime, fat, and alkali metal carbonates, and cement, for which suitable proportions are 5 pounds of cement to 1 pound of the said compound. After having been allowed to harden, the facing is scraped with a toothed instrument, technically termed a "drag".

What we claim and desire to secure by Letters Patent is:

1. For facing walls and partitions in buildings, a composition in simulation of freestone and having the following constituents, namely, a fine clean sand, white cement, silver sand, a compound containing hydrated lime, fat, and alkali metal carbonates, a solution of sulphate of iron and alum, hydrochloric acid and water.

2. For facing walls and partitions in buildings, a composition in simulation of freestone and having the following constituents, namely, freestone dust, white cement, silver sand, a compound containing hydrated lime, fat, and alkali metal carbonates, a solution of sulphate of iron and alum, hydrochloric acid and water.

3. For facing walls and partitions in buildings, a composition in simulation of freestone and having solid constituents mixed in approximately the following proportions, namely, a fine clean sand, 50%, white cement, 25%, silver sand, 20%, a compound containing hydrated lime, fat, and alkali metal carbonates, 5%, the said solid mass being mixed with a liquid having constituents in approximately the following proportions, namely, hydrochloric acid, ¼ pint, and a solution containing sulphate of iron ¼ ounce, alum, 1 ounce, the mixture of the said solid mass and the said liquid being effected in approximately the proportion of 8 gallons of the solid mass to 2 gallons of the liquid, substantially as described.

In testimony whereof we have signed our names to this specification.

ROBERT FREDERICK WILKINS.
HARRY CHANDLER.